(12) United States Patent
Lin et al.

(10) Patent No.: US 11,810,284 B2
(45) Date of Patent: Nov. 7, 2023

(54) UNSUPERVISED LEARNING FOR REPEATER-DEFECT DETECTION

(71) Applicant: KLA Corporation, Milpitas, CA (US)

(72) Inventors: Jheng Sian Lin, New Taipei (TW); Boon Kiat Tay, Singapore (SG)

(73) Assignee: KLA Corporation, Milpitas, CA (US)

( * ) Notice: Subject to any disclaimer, the term of this patent is extended or adjusted under 35 U.S.C. 154(b) by 484 days.

(21) Appl. No.: 17/184,189

(22) Filed: Feb. 24, 2021

(65) Prior Publication Data

US 2022/0058787 A1    Feb. 24, 2022

Related U.S. Application Data

(60) Provisional application No. 63/068,380, filed on Aug. 21, 2020.

(51) Int. Cl.
*G06K 9/00* (2022.01)
*G06T 7/00* (2017.01)
(Continued)

(52) U.S. Cl.
CPC ............ *G06T 7/0004* (2013.01); *G06F 18/23* (2023.01); *G06F 18/24* (2023.01); *G06N 5/04* (2013.01);
(Continued)

(58) Field of Classification Search
CPC ........... G01N 21/9501; G01N 21/8851; G01N 21/95607; G01N 2021/8861;
(Continued)

(56) References Cited

U.S. PATENT DOCUMENTS 6,882,745 B2 * 4/2005 Brankner ......... G01N 21/95607
382/144
10,395,362 B2 * 8/2019 Gupta ................... G06N 20/00
(Continued)

FOREIGN PATENT DOCUMENTS

KR    20190035511 A    4/2019
KR    20200086485 A    7/2020

OTHER PUBLICATIONS

M. Ester et al., "A Density-Based Algorithm for Discovering Clusters in Large Spatial Databases with Noise," Proceedings of the 2nd International Conference on Knowledge Discovery and Data Mining, AAAI Press, pp. 226-231, 1996.
(Continued)

*Primary Examiner* — Hoa Q Pham
(74) *Attorney, Agent, or Firm* — Huse IP Law; Charles C. Huse (57) ABSTRACT

To find repeater defects, optical-inspection results for one or more semiconductor wafers are obtained. Based on the optical-inspection results, a plurality of defects on the one or more semiconductor wafers is identified. Defects, of the plurality of defects, that have identical die locations on multiple die of the one or more semiconductor wafers are classified as repeater defects. Based on the optical-inspection results, unsupervised machine learning is used to cluster the repeater defects into a plurality of clusters. The repeater defects are scored. Scoring the repeater defects includes assigning respective scores to respective repeater defects based on degrees to which clusters in the plurality of clusters include multiple instances of the respective repeater defects. The repeater defects are ranked based on the respective scores.

27 Claims, 4 Drawing Sheets

(51) Int. Cl.
*G06T 7/70* (2017.01)
*G06N 20/00* (2019.01)
*G06N 5/04* (2023.01)
*G06F 18/23* (2023.01)
*G06F 18/24* (2023.01)

(52) U.S. Cl.
CPC ............... *G06N 20/00* (2019.01); *G06T 7/70* (2017.01); *G06T 2207/30148* (2013.01)

(58) Field of Classification Search
CPC .......... G01N 2021/95676; G06T 2207/30148; G06T 2207/10061; G06T 2207/20076; G06T 2207/10152; G06T 2207/20224; G06T 7/006; G06T 7/001; G06T 7/74; G06T 7/0004; G06T 7/70; G06K 9/6267; G06K 9/6218; G06N 5/40
USPC ..................... 382/149–154; 356/237.1–237.5
See application file for complete search history.

(56) References Cited

U.S. PATENT DOCUMENTS

| | | | |
|---|---|---|---|
| 10,600,175 B2* | 3/2020 | Brauer | G01N 21/9501 |
| 10,648,925 B2* | 5/2020 | Shifrin | H01L 22/20 |
| 10,957,033 B2* | 3/2021 | Shankar | G06T 5/50 |
| 2003/0061212 A1 | 3/2003 | Smith et al. | |
| 2018/0130199 A1 | 5/2018 | Brauer et al. | |
| 2018/0275523 A1* | 9/2018 | Biafore | G01N 21/8851 |
| 2018/0276808 A1 | 9/2018 | Brauer et al. | |
| 2019/0096659 A1 | 3/2019 | Xu et al. | |
| 2019/0346376 A1* | 11/2019 | Brauer | H01L 22/12 |
| 2021/0342992 A1* | 11/2021 | Chen | G01N 21/9501 |

OTHER PUBLICATIONS

PCT/US2021/046397, International Search Report, dated Dec. 10, 2021.
PCT/US2021/046397, Written Opinion of the International Searching Authority, dated Dec. 10, 2021.

* cited by examiner

UNSUPERVISED LEARNING FOR REPEATER-DEFECT DETECTION

RELATED APPLICATION

This application claims priority to U.S. Provisional Patent Application No. 63/068,380, filed on Aug. 21, 2020, which is incorporated by reference in its entirety for all purposes.

TECHNICAL FIELD

This disclosure relates to semiconductor defect detection, and more specifically to detecting repeater defects using unsupervised learning.

BACKGROUND

Repeater defects on a semiconductor wafer are defects that occur at the same die location on multiple die on the wafer. Repeater defects may be caused by a defect on a reticle (i.e., photomask), which causes a layer to be patterned incorrectly at the same location on certain die on the wafer (i.e., at the same reticle-level location on multiple die on the wafer). Finding and eliminating repeater defects is an important part of yield improvement for semiconductor fabrication.

Defects on semiconductor wafers, including repeater defects, may be identified through optical inspection of the wafers. Optical inspection, however, identifies nuisance defects as well as defects of interest. Defects of interest are true defects that impair the functionality of semiconductor devices, while nuisance defects result from minor process variations and do not impair device functionality. The presence of defects of interest on a semiconductor wafer reduces the wafer yield (i.e., the number or percentage of functional die on the wafer). The presence of nuisance defects on a semiconductor wafer does not affect yield. Engineers are thus interested in finding defects of interest but not nuisance defects. In modern optical inspection, however, nuisance defects may outnumber defects of interest by several orders of magnitude.

Repeater defects may be identified by performing optical inspection and identifying defects that have the same die-level or reticle-level locations (e.g., by stacking images of multiple die). But this approach suffers from a low signal-to-noise ratio for finding repeater defects that are defects of interest: because of the large number of nuisance defects identified by optical inspection, many of the repeater defects identified using this approach end up being nuisance defects.

SUMMARY

Accordingly, there is a need for more accurate methods and systems for identifying repeater defects that are defects of interest.

In some embodiments, a method of finding repeater defects includes obtaining optical-inspection results for one or more semiconductor wafers. Based on the optical-inspection results, a plurality of defects on the one or more semiconductor wafers is identified. Defects, of the plurality of defects, that have identical die locations on multiple die of the one or more semiconductor wafers are classified as repeater defects. Based on the optical-inspection results, unsupervised machine learning is used to cluster the repeater defects into a plurality of clusters. The repeater defects are scored. Scoring the repeater defects includes assigning respective scores to respective repeater defects based on degrees to which clusters in the plurality of clusters include multiple instances of the respective repeater defects. The repeater defects are ranked based on the respective scores.

In some embodiments, a non-transitory computer-readable storage medium stores one or more programs for execution by one or more processors. The one or more programs include instructions for performing the above method.

In some embodiments, a system includes an optical inspection tool, one or more processors, and memory storing one or more programs for execution by the one or more processors. The one or more programs include instructions for performing the above method.

This method, system, and non-transitory computer-readable storage medium allow repeater defects that are defects of interest (i.e., true repeater defects) to be identified with a high signal-to-noise ratio.

BRIEF DESCRIPTION OF THE DRAWINGS

For a better understanding of the various described embodiments, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
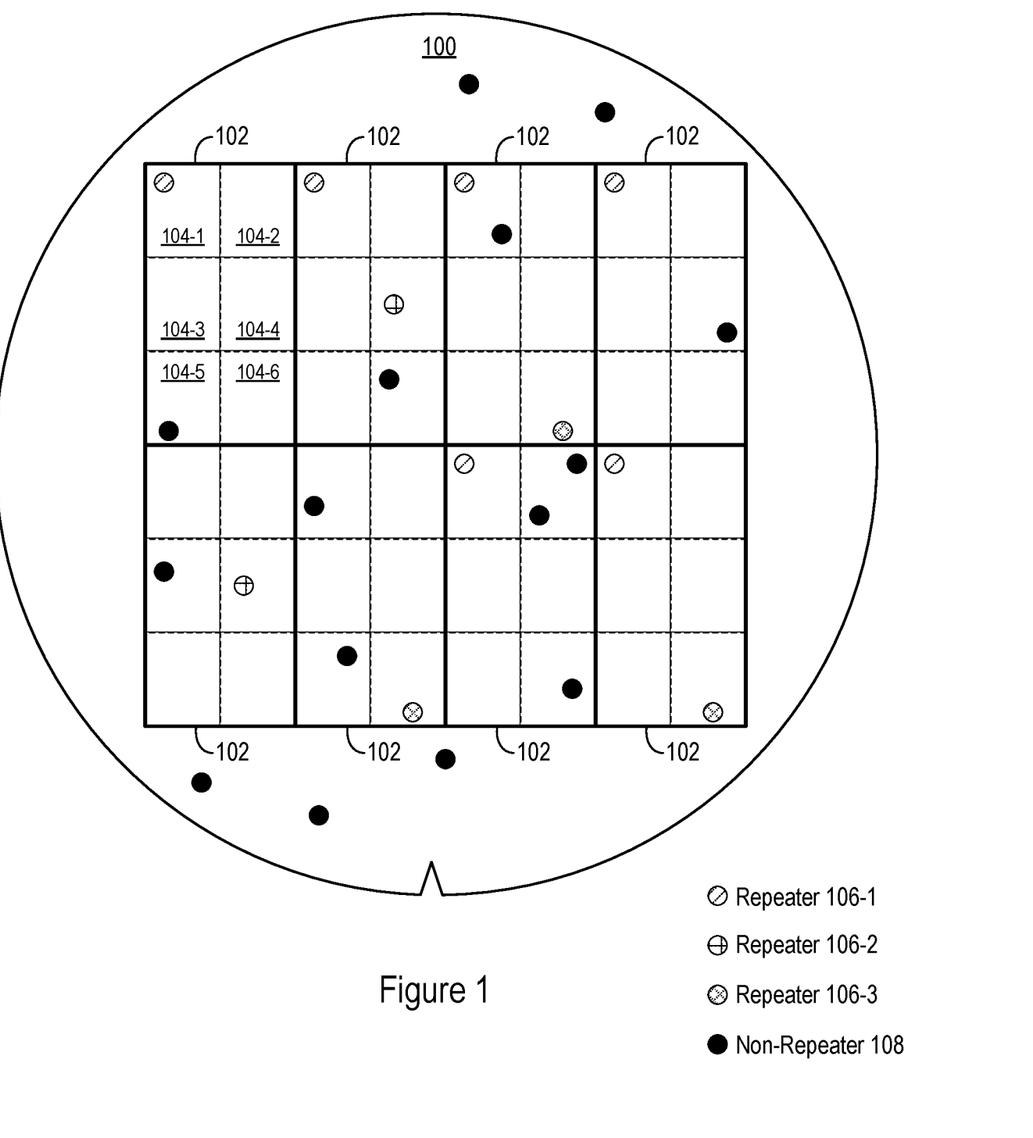
FIG. 1 is a wafer map showing defect locations on a semiconductor wafer.

FIG. 1 is a wafer map showing defect locations on a semiconductor wafer 100. The semiconductor wafer 100 has a plurality of die 104 that are fabricated using photolithography, by stepping reticles (i.e., photomasks) across the wafer 100 and successively exposing respective regions 102 on the wafer to pattern respective layers of the plurality of die 104. Each region 102 contains an array of semiconductor die 104. Each semiconductor die 104 in an array (i.e., in a region 102) corresponds to a respective patterned region on a reticle. Each reticle has an array of nominally identical patterned regions, each of which corresponds to a respective semiconductor die 104 in the array of each region 102. In the example of FIG. 1, each region 102 has a 2×3 array of semiconductor die 104-1 through 104-6, and each reticle has a corresponding 2×3 array of nominally identical patterned regions. Other examples of array sizes for the regions 102 and reticles are possible, as are other examples of the number of semiconductor die 104 on the wafer 100.

The defects shown on the wafer map of the semiconductor wafer 100 includes repeater defects 106 and non-repeater defects 108. In the example of FIG. 1, the repeater defects include repeater defects 106-1, 106-2, and 106-3. The repeater defects 106-1 occur at the same die-level location in six instances of the semiconductor die 104-1, and thus occur at the same reticle-level location in six different die. The repeater defects 106-2 occur at the same die-level location in two instances of the semiconductor die 104-4, and thus occur at the same reticle-level location in two different die. The repeater defects 106-3 occur at the same die-level location in three instances of the semiconductor die 104-6, and thus occur at the same reticle-level location in three different die. The non-repeater defects 108 do not occur at the same die-level locations in multiple semiconductor die 104, and thus do not occur at the same reticle-level locations in multiple semiconductor die 104. In general, defects have the same reticle-level location if they are at the same location within multiple die and if the multiple die are at the same location in respective arrays in the regions 102.

Figure 2:
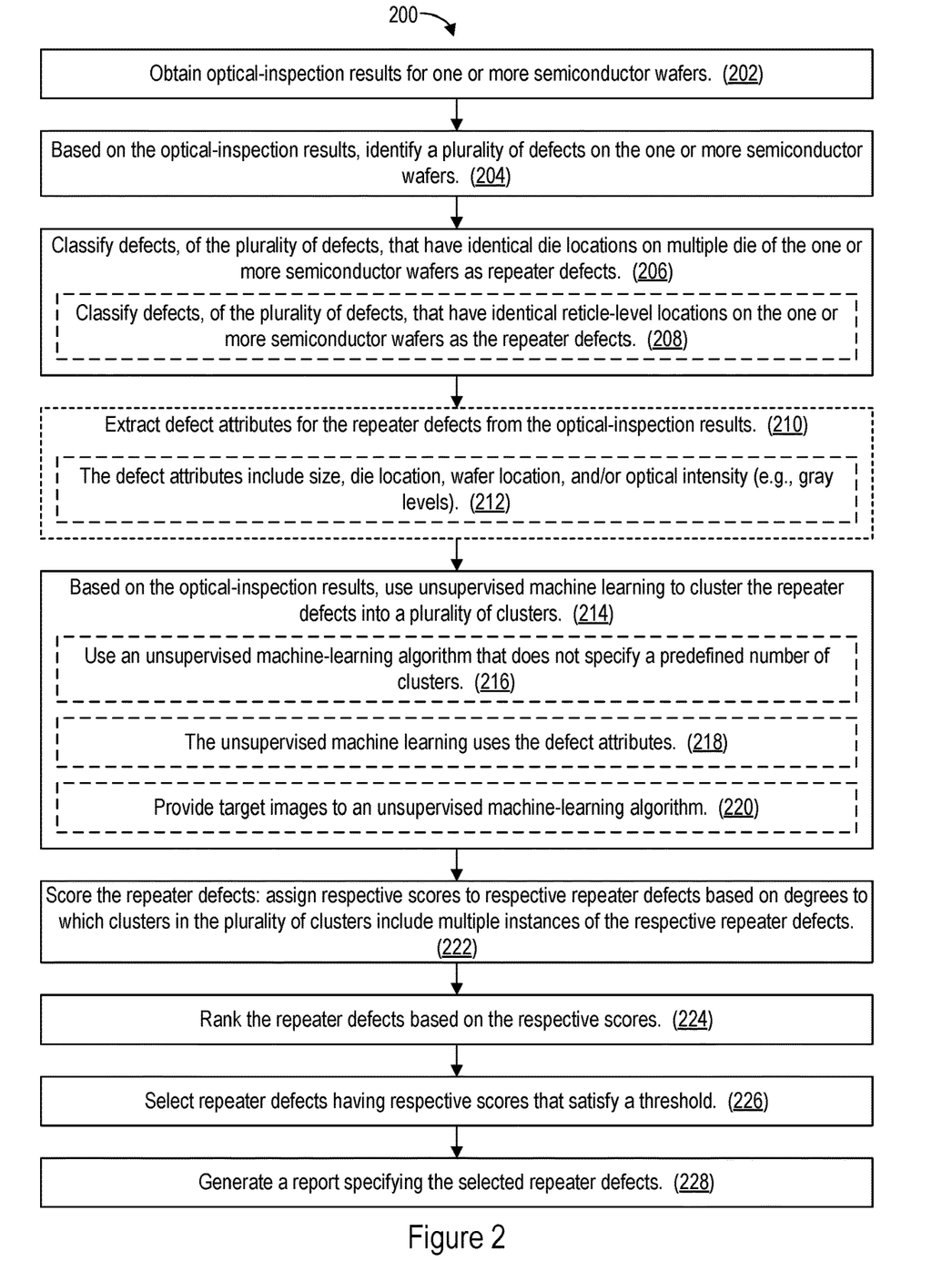
FIG. 2 is a flowchart showing a method of finding repeater defects, in accordance with some embodiments.

FIG. 2 is a flowchart showing a method 200 of finding repeater defects (e.g., repeater defects 106-1, 106-2, and/or 106-3, FIG. 1), in accordance with some embodiments. The method 200 may be performed by a computer system communicatively coupled to an optical inspection tool (e.g., optical inspection tool 530, FIG. 5). For example, the method 200 may be performed by a computer system in the semiconductor defect identification system 500, FIG. 5.

In the method 200, optical-inspection results are obtained (202) for one or more semiconductor wafers (e.g., for one or more instances of the semiconductor wafer 100, FIG. 1). The optical-inspection results include difference images of semiconductor die on the one or more semiconductor wafers. Each difference image is a difference between a respective target image and a reference image: a difference image is generated by comparing a target image of the die with a reference image (e.g., by subtracting the reference image from the target image, or vice-versa). The target images are generated by scanning the one or more wafers using an optical inspection tool (e.g., optical inspection tool 530, FIG. 5). In some embodiments, the optical-inspection results also include the target images. The optical-inspection results may be obtained directly from the optical inspection tool and/or may be obtained by being retrieved from the memory (e.g., memory 510, FIG. 5) of a computer system in which they were previously stored.

Based on the optical-inspection results, a plurality of defects on the one or more semiconductor wafers is identified (204). For example, the plurality of defects is identified in the difference images. The plurality of defects includes both repeater defects and non-repeater defects, but at this point in the method 200 it has not yet been determined which are which. Similarly, the plurality of defects includes both defects of interest and nuisance defects, but at this point in the method 200 it is not known which are which.

Defects, of the plurality of defects, that have identical die locations on multiple die of the one or more semiconductor wafers are classified (206) as repeater defects. In some embodiments, defects, of the plurality of defects, that have identical reticle-level locations on the one or more semiconductor wafers are classified (208) as the repeater defects. Defects that do not occur at identical locations on multiple die, or do not occur at identical reticle-level locations, are not classified as repeater defects (e.g., are classified as non-repeater defects). For example, the defects 106-1, 106-2, and 106-3 (FIG. 1) are classified as repeater defects, while defects 108 (FIG. 1) are not classified as repeater defects (e.g., are classified as non-repeater defects).

In some embodiments, defect attributes for the repeater defects are extracted (210) from the optical-inspection results. The defect attributes may include (212), for example, size, die location, wafer location, and/or optical intensity (e.g., as indicated by gray levels in a difference image). Once extracted, the defect attributes may be included in the optical-inspection results.

Based on the optical-inspection results, unsupervised machine learning (also referred to as unsupervised learning) is used (214) to cluster the repeater defects into a plurality of clusters. Non-repeater defects are excluded from the clustering, in accordance with some embodiments. The unsupervised machine learning may be performed using (216) an unsupervised machine-learning algorithm that does not specify a predefined number of clusters into which the plurality of defects is to be clustered. For example, the density-based spatial clustering of applications with noise (DBSCAN) algorithm, which does not specify a predefined number of clusters into which items (in this case, defects) are to be clustered, may be used. The unsupervised machine learning may determine that some repeater defects are outliers that are not included in any clusters of the plurality of clusters. The outliers may be discarded and thus not considered in subsequent steps of the method 200.

In some embodiments, the unsupervised machine learning uses (218) the defect attributes for the repeater defects, as extracted in step 210. An unsupervised machine-learning algorithm receives the defect attributes as input and uses the defect attributes to cluster the repeater defects into the plurality of clusters. The defect attributes may be used as dimensions of a space in which the repeater defects are clustered.

In some embodiments (e.g., in which the defect-attribute extraction 210 is not performed), target images from the optical inspection are provided (220) to an unsupervised machine-learning algorithm. A target image may also be referred to as a patch image. The unsupervised machine-learning algorithm receives the target images as input and uses the target images to cluster the plurality of defects into the plurality of clusters. The unsupervised machine-learning algorithm thus may perform the clustering without receiving extracted defect attributes; such embodiments are viable because information about defect attributes is inherently embedded in the target images.

The repeater defects are scored (222). Respective scores are assigned to respective repeater defects (i.e., to respective groups of defects having the same die location (e.g., the same reticle-level location)) based on degrees to which clusters in the plurality of clusters include multiple instances of the respective repeater defects. The scores are thus based on the appearance of repeater defects with identical die locations (e.g., with identical reticle-level locations) in the respective clusters.

For example, the proportion (e.g., fraction or percentage) of each repeater defect in each cluster is calculated:

$$P_{ij}=C_{ij}/T_j \quad (1)$$

where $C_{ij}$ is the number of instances (i.e., the defect count) of the ith repeater defect in the jth cluster, $T_j$ is the total defect count (i.e., the total number of repeater defects, regardless of location) in the jth cluster, and $P_{ij}$ is the proportion of the ith repeater defect in the jth cluster. The scores may be determined based on these proportions. In some embodiments, each score corresponds to a maximum percentage (or fraction) of instances of a respective repeater defect in a cluster of the plurality of clusters:

$$\text{Score}_i = \max_j(P_{ij}) \quad (2)$$

where i indexes repeater defects and j indexes clusters. In some other embodiments, each score corresponds to a mean of non-zero percentages of instances of a respective repeater defect in the plurality of clusters:

$$\text{Score}_i = \text{mean}_{\forall P_{ij} \neq 0}(P_{ij}) \quad (3)$$

where, again, i indexes repeater defects and j indexes clusters.

The repeater defects are ranked (224) based on the respective scores. In some embodiments, repeater defects with respective scores that satisfy a threshold are selected (226). For example, repeater defects with scores that exceed, or equal or exceed, a threshold value are selected. In another example, a specified number or percentage of repeater defects with the highest scores are selected (i.e., the threshold is that a repeater defect's score places it in a specified number or percentage of top-scoring repeater defects).

Figure 3A:
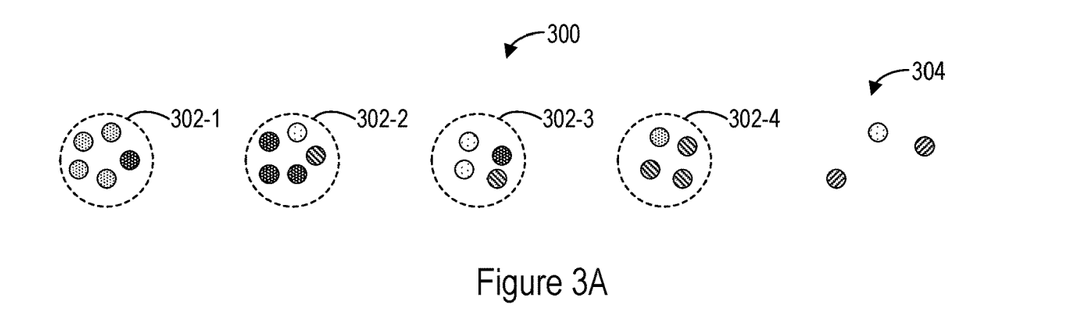
FIG. 3A shows an example of results of the clustering performed using unsupervised machine learning in the method of FIG. 2, in accordance with some embodiments.

FIG. 3A shows an example of hypothetical results 300 of the clustering performed using unsupervised machine learning in step 214, in accordance with some embodiments. The results 300 include four clusters 302-1 through 302-4 as well as outliers 304 that are not included in any of the clusters 302. The outliers 304 are discarded and thus not considered when scoring and ranking the repeater defects in steps 222 and 224. Repeater defects classified in step 206 include five different repeater defects 306-1 through 306-5. The cluster 302-1 includes four instances of the repeater defect 306-1 and one instance of the repeater defect 306-2. The cluster 302-2 includes three instances of the repeater defect 306-2, one instance of the repeater defect 306-3, and one instance of the repeater defect 306-4. The cluster 302-3 includes two instances of the repeater defect 306-3, one instance of the repeater defect 306-2, and one instance of the repeater defect 306-4. The cluster 302-4 includes three instances of the repeater defect 306-4 and one instance of the repeater defect 306-1. None of the clusters 302-1 through 302-4 includes any instances of the repeater defect 306-5.

Figure 3B:
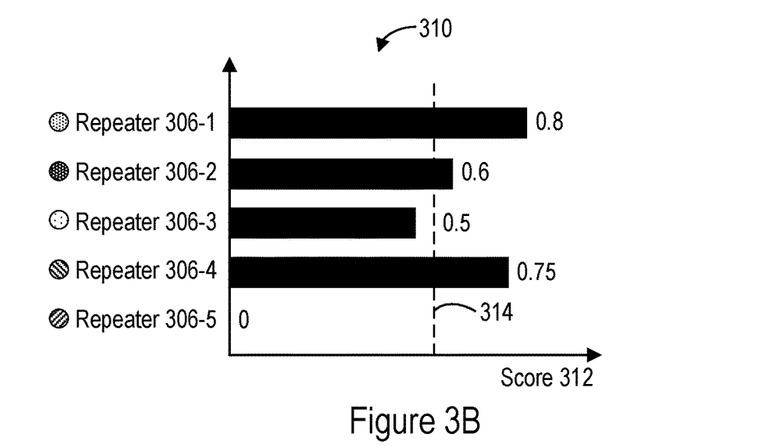
FIG. 3B shows a graph of scores for repeater defects based on the clustering in FIG. 3A, in accordance with some embodiments.

FIG. 3B shows a graph 310 of scores 312 for the repeater defects 306-1 through 306-5, in accordance with some embodiments. As shown, the highest proportion of the repeater defect 306-1 in the clusters 302 is 80% (4 of 5) in the cluster 302-1. The highest proportion of the repeater defect 306-2 in the clusters 302 is 60% (3 of 5) in the cluster 302-2. The highest proportion of the repeater defect 306-3 in the clusters 302 is 50% (2 of 4) in the cluster 302-3. The highest proportion of the repeater defect 306-4 in the clusters 302 is 75% (3 of 4) in the cluster 302-4. And the highest proportion of the repeater defect 306-5 in the clusters 302 is zero, because no instances of the repeater defect 306-5 occur in any of the clusters 302-1 through 302-4. Accordingly, the repeater defects 306-1 through 306-5 have respective scores of 0.8, 0.6, 0.5, 0.75, and 0. (In some embodiments, the repeater defect 306-5 is not assigned a score, because it only occurs as an outlier.) As ranked based on their scores, the ordering of the repeater defects 306 is (from highest to lowest) 306-1, 306-4, 306-2, 306-3, and 306-5. The scores of the repeater defects 306-1, 306-2, and 306-4 satisfy a threshold 314, while the scores of the repeater defects 306-3 and 306-5 do not. Accordingly, the repeater defects 306-1, 306-2, and 306-4 are selected, while the repeater defects 306-3 and 306-5 are not.

In some embodiments, a report is generated (228) specifying the selected repeater defects. For example, the report may specify only the selected repeater defects. In another example, the report may include both selected and unselected repeater defects and indicate which of the repeater defects have been selected. The report may include a list of repeater defects and/or corresponding clusters, and/or may include a wafer map. The ratio of defects of interest to nuisance defects is significantly higher for the selected repeater defects than for the set of defects classified as repeater defects in step 206.

The unsupervised machine-learning algorithm used in step 214 of the method 200 (FIG. 2) may have one or more hyperparameters. Hyperparameters are parameters with values that are selected in advance of performing machine learning. The selected values of hyperparameters thus are not based on the data being processed during machine learning. An example of such a hyperparameter is "eps" (also referred to as epsilon) for DBSCAN. During the development process for the unsupervised machine-learning algorithm, the method 200 may be performed repeatedly with different hyperparameter values (e.g., with different values of eps) for the same optical-inspection results (and thus for the same one or more semiconductor wafers). The value that produces the highest repeater count (e.g., that produces selected clusters with the largest total number of defects) may be chosen as the hyperparameter value. This hyperparameter value is then used when the method 200 is implemented in a production environment.

Figure 4:
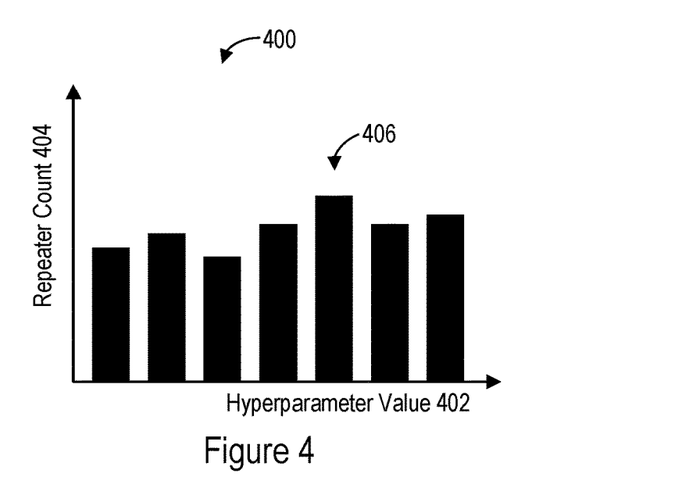
FIG. 4 shows a graph used to select a hyperparameter value, in accordance with some embodiments.

FIG. 4 shows a hypothetical graph 400 used to select a hyperparameter value, in accordance with some embodiments. The y-axis of the graph 400 is the repeater count 404 and the x-axis of the graph 400 is the hyperparameter value 402. Different hyperparameter values 402 result in different repeater counts 404 for different iterations of the method 200. A hyperparameter value 406 that produces the highest repeater count 404 is selected and used for unsupervised machine learning when the method 200 is implemented in a production environment.

Figure 5:
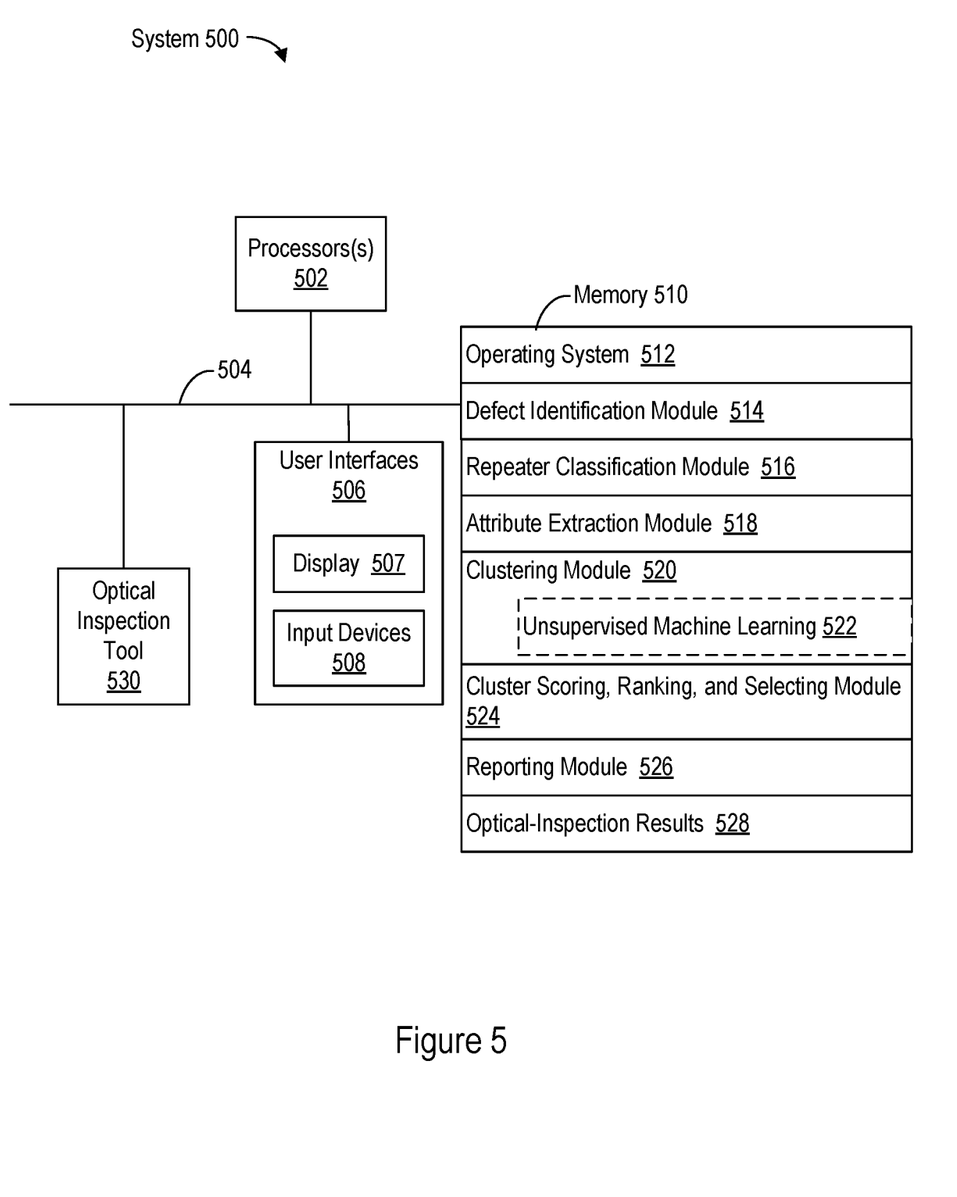
FIG. 5 is a block diagram of a semiconductor defect identification system in accordance with some embodiments.

FIG. 5 is a block diagram of a semiconductor defect identification system 500 in accordance with some embodiments. The semiconductor defect identification system 500 includes an optical inspection tool 530 and a computer system with one or more processors 502 (e.g., CPUs), user interfaces 506, memory 510, and communication bus(es) 504 interconnecting these components. In some embodiments, the optical inspection tool 530 is communicatively coupled to the computer system through one or more wired and/or wireless networks. In some embodiments, the semiconductor defect identification system 500 includes multiple optical inspection tools 530 communicatively coupled with the computer system. The computer system may further include one or more wired and/or wireless network interfaces for communicating with the optical inspection tool(s) 530 and/or remote computer systems.

The user interfaces 506 may include a display 507 and one or more input devices 508 (e.g., a keyboard, mouse, touch-sensitive surface of the display 507, etc.). The display 507 may display results, including reports specifying repeater defects (e.g., reports specifying selected clusters per step 228 of the method 200, FIG. 2).

Memory 510 includes volatile and/or non-volatile memory. Memory 510 (e.g., the non-volatile memory within memory 510) includes a non-transitory computer-readable storage medium. Memory 510 optionally includes one or more storage devices remotely located from the processors 502 and/or a non-transitory computer-readable storage medium that is removably inserted into the system 500. The memory 510 (e.g., the non-transitory computer-readable storage medium of the memory 510) includes instructions for performing all or a portion of the method 200 (FIG. 2).

In some embodiments, memory 510 (e.g., the non-transitory computer-readable storage medium of memory 510) stores the following modules and data, or a subset or superset thereof: an operating system 512 that includes procedures for handling various basic system services and for performing hardware-dependent tasks; a defect identification module 514 (e.g., for performing step 204 of the method 200, FIG. 2); a repeater classification module 516 (e.g., for performing step 206 of the method 200, FIG. 2); an attribute extraction module 518 (e.g., for performing step 210 of the method 200, FIG. 2); a clustering module 520 (e.g., for performing step 214 of the method 200, FIG. 2); a cluster scoring, ranking, and selection module 524 (e.g., for performing steps 222, 224, and/or 226 of the method 200, FIG. 2); a reporting module 526 (e.g., for performing step 228 of the method 200, FIG. 2); and optical-inspection results 528 (e.g., including difference images, target images, and/or defect attributes). The clustering module 520 may perform unsupervised machine learning 522 (e.g., may include instructions for implementing an unsupervised machine-learning algorithm). In some embodiments, the unsupervised machine learning 522 does not specify a predefined number of clusters into which the plurality of defects will be clustered.

Each of the modules stored in the memory 510 corresponds to a set of instructions for performing one or more functions described herein. Separate modules need not be implemented as separate software programs. The modules and various subsets of the modules may be combined or otherwise re-arranged. In some embodiments, the memory 510 stores a subset or superset of the modules and/or data structures identified above.

FIG. 5 is intended more as a functional description of various features that may be present in a semiconductor defect identification system than as a structural schematic. For example, the functionality of the computer system in the semiconductor defect identification system 500 may be split between multiple devices. A portion of the modules stored in the memory 510 may alternatively be stored in one or more other computer systems communicatively coupled with the computer system of the semiconductor defect identification system 500 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
obtaining optical-inspection results for one or more semiconductor wafers;
based on the optical-inspection results, identifying a plurality of defects on the one or more semiconductor wafers;
classifying defects, of the plurality of defects, that have identical die locations on multiple die of the one or more semiconductor wafers as repeater defects;
based on the optical-inspection results, using unsupervised machine learning to cluster the repeater defects into a plurality of clusters;
scoring the repeater defects, comprising assigning respective scores to respective repeater defects based on degrees to which clusters in the plurality of clusters include multiple instances of the respective repeater defects; and
ranking the repeater defects based on the respective scores.

2. The method of claim 1, further comprising:
selecting repeater defects having respective scores that satisfy a threshold; and
generating a report specifying the selected repeater defects.

3. The method of claim 1, wherein the classifying comprises classifying defects, of the plurality of defects, that have identical reticle-level locations on the one or more semiconductor wafers as the repeater defects.

4. The method of claim 1, wherein each score corresponds to a maximum percentage of instances of a respective repeater defect in a cluster of the plurality of clusters.

5. The method of claim 1, wherein each score corresponds to a mean of non-zero percentages of instances of a respective repeater defect in the plurality of clusters.

6. The method of claim 1, further comprising extracting defect attributes for the repeater defects from the optical-inspection results, wherein the unsupervised machine learning uses the defect attributes.

7. The method of claim 6, wherein the defect attributes comprise defect attributes selected from the group consisting of size, die location, wafer location, and optical intensity.

8. The method of claim 1, wherein:
the optical-inspection results comprise target images of die on the one or more semiconductor wafers and difference images of the die on the one or more semiconductor wafers, each difference image being a difference between a respective target image and a reference image;
the identifying comprises identifying the plurality of defects in the difference images; and
using the unsupervised machine learning to cluster the repeater defects comprises providing the target images to an unsupervised machine-learning algorithm.

9. The method of claim 1, wherein using the unsupervised machine learning to cluster the repeater defects is performed using an unsupervised machine-learning algorithm that does not specify a predefined number of clusters.

10. A non-transitory computer-readable storage medium storing one or more programs for execution by one or more processors, the one or more programs including instructions for:
obtaining optical-inspection results for one or more semiconductor wafers;
based on the optical-inspection results, identifying a plurality of defects on the one or more semiconductor wafers;
classifying defects, of the plurality of defects, that have identical die locations on multiple die of the one or more semiconductor wafers as repeater defects;
based on the optical-inspection results, using unsupervised machine learning to cluster the repeater defects into a plurality of clusters;

scoring the repeater defects, comprising assigning respective scores to respective repeater defects based on degrees to which clusters in the plurality of clusters include multiple instances of the respective repeater defects; and ranking the repeater defects based on the respective scores.

11. The computer-readable storage medium of claim 10, the one or more programs further comprising instructions for:

selecting repeater defects having respective scores that satisfy a threshold; and generating a report specifying the selected repeater defects.

12. The computer-readable storage medium of claim 10, wherein the instructions for classifying comprise instructions for classifying defects, of the plurality of defects, that have identical reticle-level locations on the one or more semiconductor wafers as the repeater defects.

13. The computer-readable storage medium of claim 10, wherein each score corresponds to a maximum percentage of instances of a respective repeater defect in a cluster of the plurality of clusters.

14. The computer-readable storage medium of claim 10, wherein each score corresponds to a mean of non-zero percentages of instances of a respective repeater defect in the plurality of clusters.

15. The computer-readable storage medium of claim 10, the one or more programs further comprising instructions for extracting defect attributes for the repeater defects from the optical-inspection results, wherein the instructions for using the unsupervised machine learning comprise instructions for clustering the repeater defects using the defect attributes.

16. The computer-readable storage medium of claim 15, wherein the defect attributes comprise defect attributes selected from the group consisting of size, die location, wafer location, and optical intensity.

17. The computer-readable storage medium of claim 10, wherein:

the optical-inspection results comprise target images of die on the one or more semiconductor wafers and difference images of the die on the one or more semiconductor wafers, each difference image being a difference between a respective target image and a reference image;

the instructions for identifying comprise instructions for identifying the plurality of defects in the difference images; and the instructions for using the unsupervised machine learning to cluster the repeater defects comprise instructions for providing the target images to an unsupervised machine-learning algorithm.

18. The computer-readable storage medium of claim 10, wherein the instructions for using the unsupervised machine learning to cluster the repeater defects comprise instructions for using an unsupervised machine-learning algorithm that does not specify a predefined number of clusters.

19. A system, comprising:

an optical inspection tool;

one or more processors; and memory storing one or more programs for execution by the one or more processors, the one or more programs comprising instructions for:

obtaining optical-inspection results for one or more semiconductor wafers from the optical inspection tool;

based on the optical-inspection results, identifying a plurality of defects on the one or more semiconductor wafers;

classifying defects, of the plurality of defects, that have identical die locations on multiple die of the one or more semiconductor wafers as repeater defects;

based on the optical-inspection results, using unsupervised machine learning to cluster the repeater defects into a plurality of clusters;

scoring the repeater defects, comprising assigning respective scores to respective repeater defects based on degrees to which clusters in the plurality of clusters include multiple instances of the respective repeater defects; and ranking the repeater defects based on the respective scores.

20. The system of claim 19, the one or more programs further comprising instructions for:

selecting repeater defects having respective scores that satisfy a threshold; and generating a report specifying the selected repeater defects.

21. The system of claim 19, wherein the instructions for classifying comprise instructions for classifying defects, of the plurality of defects, that have identical reticle-level locations on the one or more semiconductor wafers as the repeater defects.

22. The system of claim 19, wherein each score corresponds to a maximum percentage of instances of a respective repeater defect in a cluster of the plurality of clusters.

23. The system of claim 19, wherein each score corresponds to a mean of non-zero percentages of instances of a respective repeater defect in the plurality of clusters.

24. The system of claim 19, the one or more programs further comprising instructions for extracting defect attributes for the repeater defects from the optical-inspection results, wherein the instructions for using the unsupervised machine learning comprise instructions for clustering the repeater defects using the defect attributes.

25. The system of claim 24, wherein the defect attributes comprise defect attributes selected from the group consisting of size, die location, wafer location, and optical intensity.

26. The system of claim 19, wherein:

the optical-inspection results comprise target images of die on the one or more semiconductor wafers and difference images of the die on the one or more semiconductor wafers, each difference image being a difference between a respective target image and a reference image;

the instructions for identifying comprise instructions for identifying the plurality of defects in the difference images; and the instructions for using the unsupervised machine learning to cluster the repeater defects comprise instructions for providing the target images to an unsupervised machine-learning algorithm.

27. The system of claim 19, wherein the instructions for using the unsupervised machine learning to cluster the repeater defects comprise instructions for using an unsupervised machine-learning algorithm that does not specify a predefined number of clusters.

* * * * *